United States Patent
Kirk et al.

(10) Patent No.: US 12,157,957 B2
(45) Date of Patent: Dec. 3, 2024

(54) POLYMER BLEND COMPOSITIONS AND DEGRADABLE EXTRUDED NETTING MADE THEREFROM

(71) Applicant: DelStar Technologies, Inc., Middletown, DE (US)

(72) Inventors: Jeffrey David Kirk, St. Paul, MN (US); Andrew John Thoen, Harris, MN (US)

(73) Assignee: DelStar Technologies, Inc.

( * ) Notice: Subject to any disclaimer, the term of this patent is extended or adjusted under 35 U.S.C. 154(b) by 693 days.

(21) Appl. No.: 17/280,005

(22) PCT Filed: Oct. 2, 2019

(86) PCT No.: PCT/US2019/054215
§ 371 (c)(1),
(2) Date: Mar. 25, 2021

(87) PCT Pub. No.: WO2020/072590
PCT Pub. Date: Apr. 9, 2020

(65) Prior Publication Data
US 2022/0034001 A1     Feb. 3, 2022

Related U.S. Application Data

(60) Provisional application No. 62/740,750, filed on Oct. 3, 2018.

(51) Int. Cl.
*D02G 3/04*     (2006.01)
*B32B 5/02*     (2006.01)
(Continued)

(52) U.S. Cl.
CPC ............. *D02G 3/045* (2013.01); *B32B 5/028* (2013.01); *C08K 5/56* (2013.01); *D04B 1/16* (2013.01);
(Continued)

(58) Field of Classification Search
CPC . B29C 47/00; C08L 67/04; C08J 3/22; D02G 3/045; B32B 5/028; C08K 5/56;
(Continued)

(56) References Cited

U.S. PATENT DOCUMENTS

2005/0183329 A1   8/2005   Cederblad et al.
2007/0255013 A1*  11/2007  Becraft .................. C08L 67/04
                                                          525/190
(Continued)

FOREIGN PATENT DOCUMENTS

CN   104514041 A   4/2015
CN   104559087 A   4/2015
(Continued)

OTHER PUBLICATIONS

Ecoplas, What is PBAT?, accesed online Sep. 5, 2023.*
(Continued)

*Primary Examiner* — Camie S Thompson
(74) *Attorney, Agent, or Firm* — Farber LLC

(57) ABSTRACT

Degradable extruded nettings include a plurality of interconnected strands, at least some of the strands being made from a polymeric blend, the polymeric blend including polylactic acid polymer composition, polybutyrate adipate terephthalate polymer composition, polylactic acid-polybutyrate compatibilizer, and a degradation additive, the degradation additive including a degrader in a carrier resin.

19 Claims, 4 Drawing Sheets

(51) Int. Cl.
  *B32B 5/24* (2006.01)
  *C08K 5/56* (2006.01)
  *D04B 1/16* (2006.01)
(52) U.S. Cl.
  CPC ............ *B32B 5/24* (2013.01); *D10B 2331/04* (2013.01); *D10B 2401/12* (2013.01); *D10B 2507/02* (2013.01)
(58) Field of Classification Search
  CPC ... D04B 1/16; D10B 2401/12; D10B 2507/02
  USPC ...... 264/178 R; 523/351, 173; 524/513, 167, 524/131; 442/50
  See application file for complete search history.

(56) References Cited

U.S. PATENT DOCUMENTS

| | | | |
|---|---|---|---|
| 2009/0157020 A1* | 6/2009 | Shi | .......................... C08L 67/02 604/378 |
| 2009/0274920 A1 | 11/2009 | Li et al. | |
| 2010/0120308 A1 | 5/2010 | Shi | |
| 2011/0039999 A1 | 2/2011 | Witt et al. | |
| 2011/0269873 A1 | 11/2011 | Seeliger et al. | |
| 2013/0147087 A1 | 6/2013 | Huang et al. | |
| 2017/0349723 A1 | 12/2017 | Ferreira et al. | |
| 2018/0142060 A1 | 5/2018 | Yang | |

FOREIGN PATENT DOCUMENTS

| | | |
|---|---|---|
| CN | 107022178 A | 8/2017 |
| CN | 107099876 A | 8/2017 |
| WO | WO2013164743 A1 | 11/2013 |
| WO | WO2015042641 A1 | 4/2015 |
| WO | WO2017087655 A1 | 5/2017 |

OTHER PUBLICATIONS

Wikipedia, Polybutylene adipate terephthalate, accessed online Sep. 5, 2023.*
Basf, Ecoflex, accessed online Sep. 5, 2023.*
China National Intellectual Property Administration ("CNIPA"); Office Action dated Dec. 31, 2021; PRC (China) Patent Application No. 201980062560.0.
International Search Report and Written Opinion; PCT/US2019/054215; Jan. 6, 2020.
European Patent Office; Extended EP Search Report dated May 27, 2022; EP Patent Application No. 19869359.0.

* cited by examiner

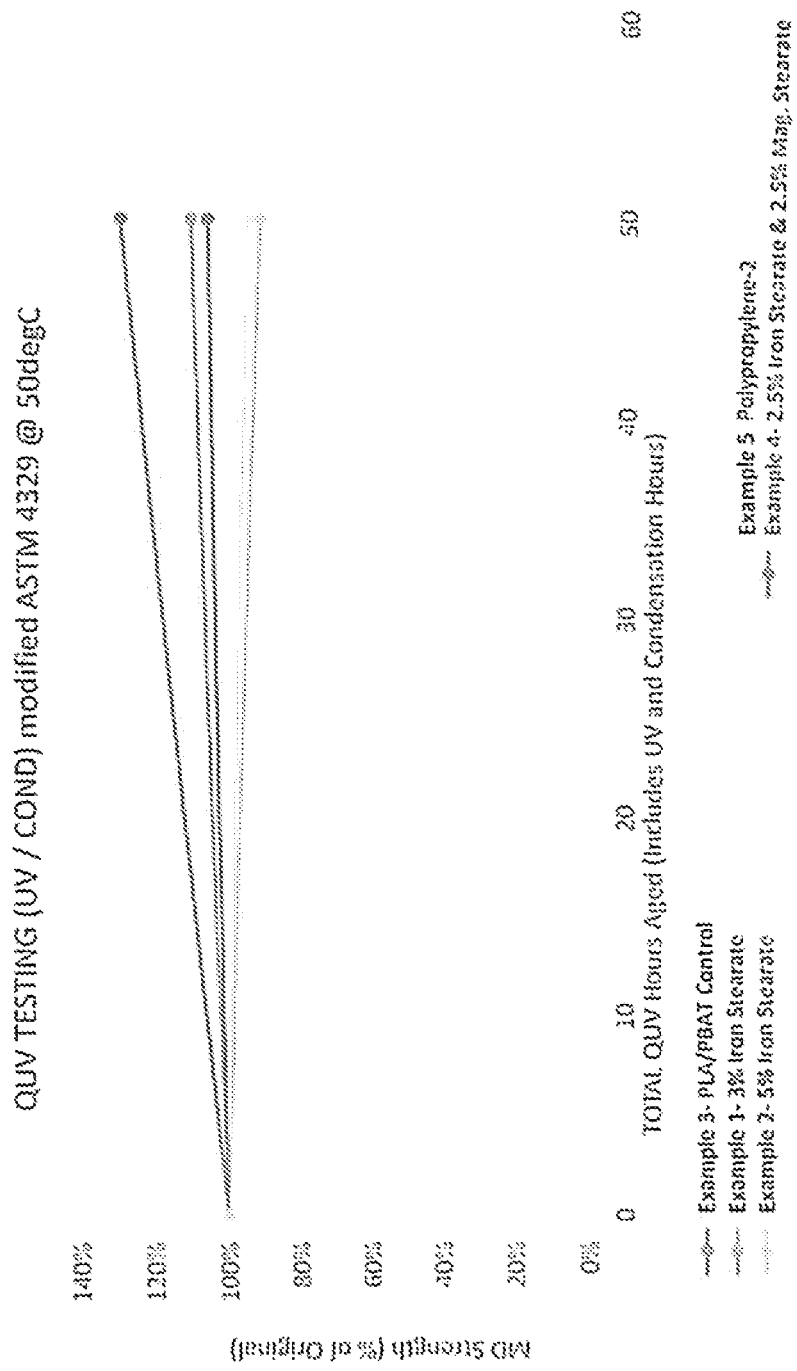

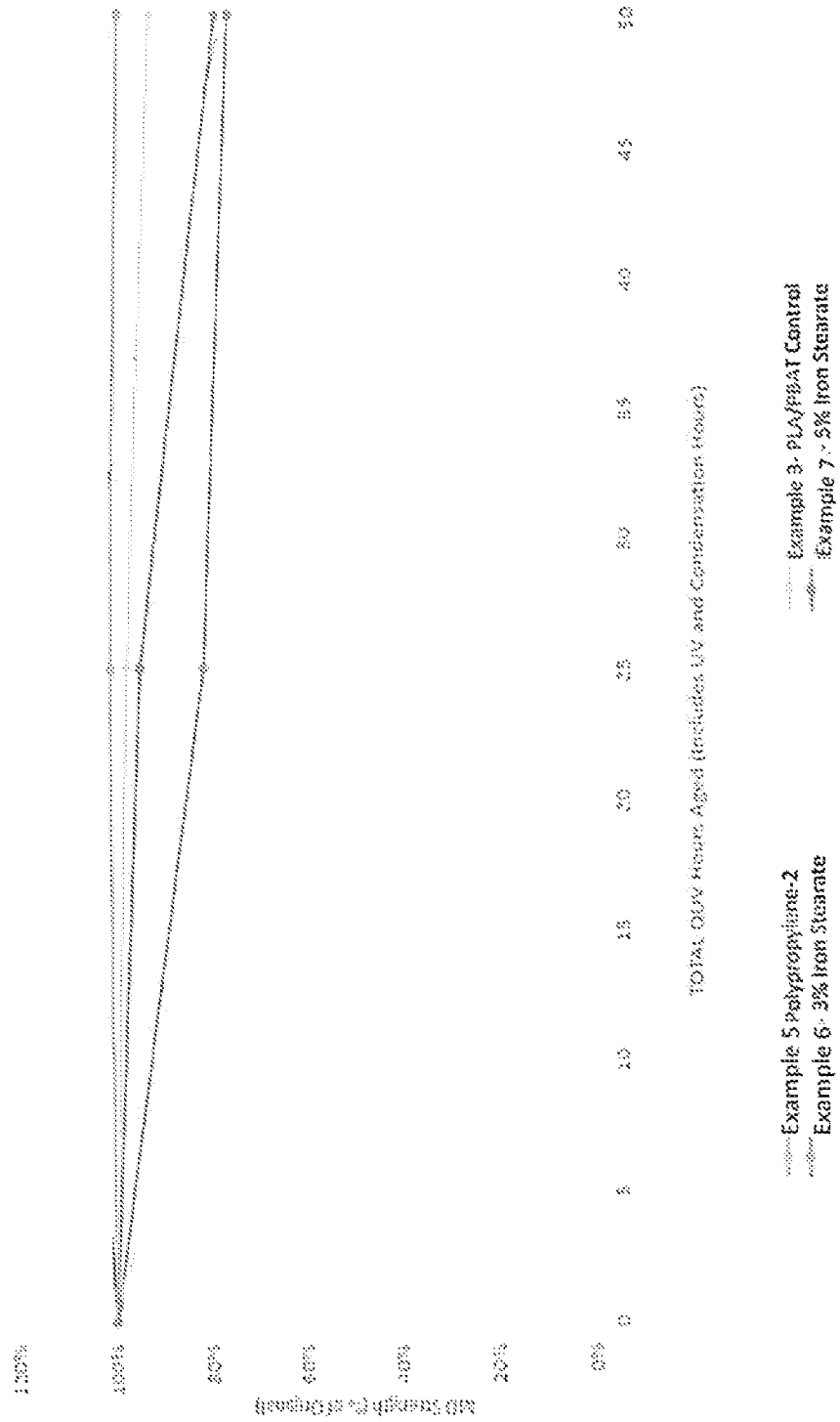

POLYMER BLEND COMPOSITIONS AND DEGRADABLE EXTRUDED NETTING MADE THEREFROM

CROSS REFERENCE TO RELATED APPLICATIONS

This application is the National Stage of International Application No. PCT/US2019/054215 filed 2 Oct. 2019 which claims benefit of U.S. Provisional Application No. 62/740,750 filed 3 Oct. 2018, the entirety of each are herein incorporated by reference.

BACKGROUND

Extruded plastic netting performs essential functionalities in hundreds of industrial and consumer products, from agriculture, packaging and consumer goods to filtration, industrial, medical, erosion control and energy applications. Currently, a typical extrusion process for manufacturing plastic netting includes extruding individual plastic strands in an interconnecting network to provide a net-like structure. See, for example, U.S. Pat. Nos. 3,700,521; 3,767,353; 3,723,218; 4,123,491; 4,152,479 and 4,190,692, the disclosures of which are incorporated by reference herein in their entireties.

It is well accepted that biodegradable plastics may provide a more eco-friendly solution to the traditional non-biodegradable plastic demands we currently experience. Biodegradable plastics can offer advantages including, for instance, reduced carbon dioxide levels, reduced greenhouse gas emission levels, ability to be broken down by naturally-occurring bacteria, avoidance of release other dangerous items upon decomposition, less energy consumption during the manufacturing cycle, and generally reduced amount of waste we produce. Accordingly, it would be desirable to manufacture extruded netting of acceptable mechanical strength using easily processable, degradable materials derived from renewable resources.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The present disclosure relates to a degradable extruded netting including a plurality of interconnected strands. At least some of the strands of the netting are made from a polymeric blend including: a polylactic acid composition; a polybutyrate composition; a polylactic acid-polybutyrate compatibilizer composition; and, a degradation additive. The degradation additive may include degrader in a carrier resin.

In some embodiments, the present polymer blend composition contains the polylactic acid composition in an amount ranging from about 55% to about 60%, the polybutyrate composition in an amount ranging from about 35% to about 40%, the compatibilizer composition in an amount ranging from about 0.5% to about 3%, and a degradation additive in an amount ranging from about 2% to about 7%.

In some embodiments, the present polymer blend composition contains about 52% to about 58% polylactic acid composition; about 38% polybutyrate polymer composition; about 2% polylactic acid-polybutyrate compatibilizer composition; and, a degradation additive in a range of about 2% to 8%.

BRIEF DESCRIPTION OF THE DRAWINGS

FIG. 3 depicts QUV with Condensation Testing Data gathered from extruded films made from compositions in accordance with Examples 1 and 2 of the present disclosure as well as comparative compositions showing percentage of strength loss in the machine direction over time; and FIG. 4 depicts QUV Testing Data gathered from extruded netting made from compositions in accordance with Examples 1 and 2 of the present disclosure as well as comparative compositions showing percentage of strength loss in the machine direction over time.

DETAILED DESCRIPTION

Particular embodiments of the present degradable extruded netting are described herein below. However, it is to be understood that the disclosed embodiments are merely exemplary of the disclosure and may be embodied in various other forms. Therefore, specific details disclosed herein are not to be interpreted as limiting, but merely as a basis for the claims and as a representative basis for teaching one skilled in the art to variously employ the present disclosure in virtually any appropriately detailed structure. Well-known functions are not described in detail to avoid obscuring the present disclosure in unnecessary detail.

The present disclosure relates to degradable extruded netting. While the following disclosure is presented with respect to degradable extruded netting for use in erosion control applications, it should be understood that the present degradable extruded netting may be readily adapted for use in a variety of other applications such as, for example: packaging netting, such as for onion and turkey bags; agricultural netting, such as for turf netting, turf wrap, hay bail, etc.; and, netting for industrial, filtration and home furnishings applications. Additionally, the present degradable extruded netting may also be adapted for use in composite fabrics for disposable diapers, incontinent briefs, training pants, bandages, dressings, diaper holders and liners and feminine hygiene garments, medical gowns, medical drapes, mattress pads, blankets, sheets, clothing, consumer wipes and other like products, such as building and construction composites.

Figure 1:
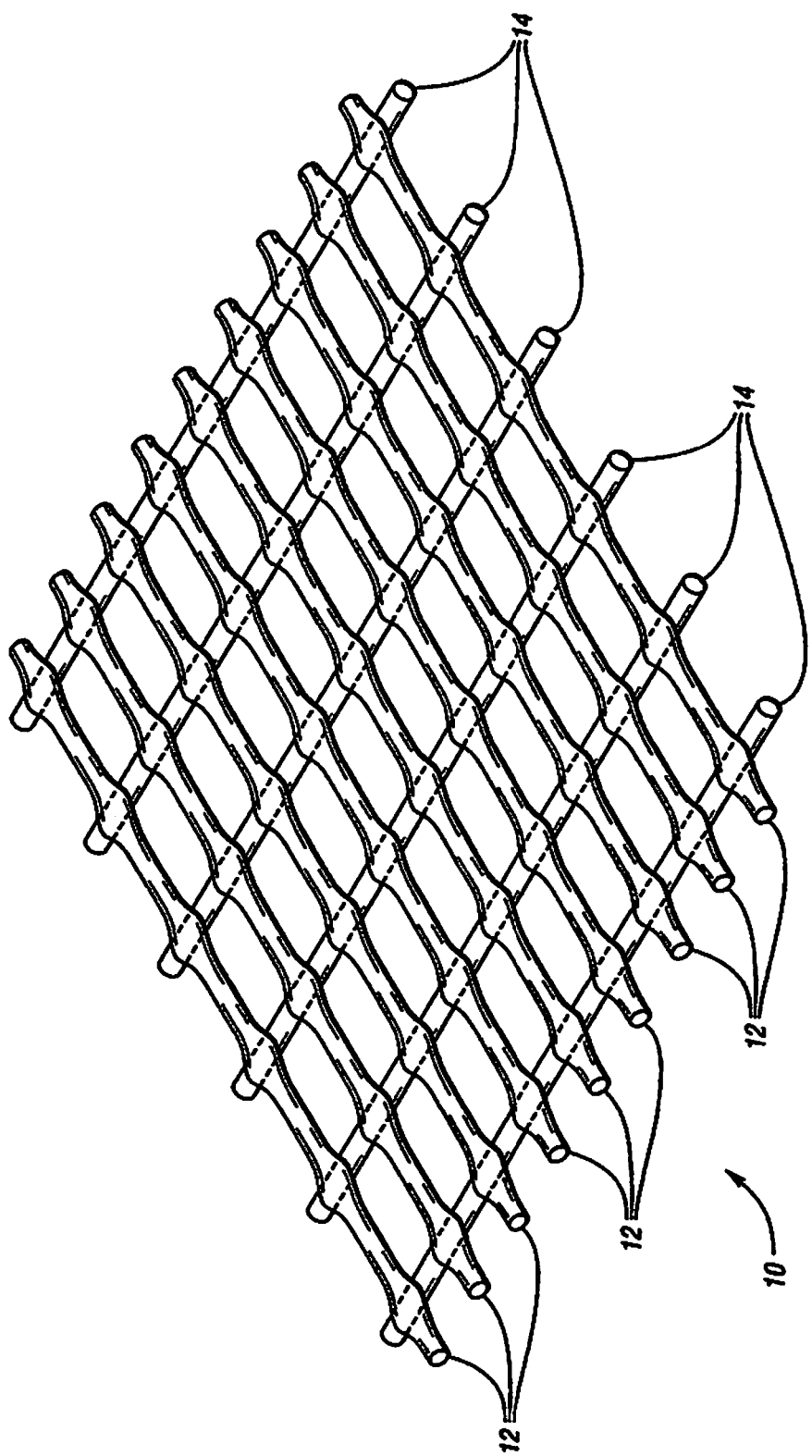
FIG. 1 is a perspective view of a netting in accordance with an illustrative embodiment of the present disclosure.

As seen in FIG. 1, the present netting 10 includes strands 12 extending in one direction and strands 14 extending in a generally crosswise or transverse direction. Strands 12 and 14 are extruded polymeric elongate members which cross and intersect during extrusion to form the net-like structure. Strands 12 and 14 could also be formed of extruded strands that are knitted together rather than crossed during extrusion. In some embodiments, strands 12 and 14 are made of the same material. In other embodiments, strands 12 are made of a different material than strands 14. For example, netting 10 may include 10 to 90 wt. % of the material of strands 12 and 10 to 90 wt. % of the material of strands 14. In still other embodiments, netting 10 may include 45 to 55 wt. % of the material of strands 12 and 45 to 55 wt. % of the material of strands 14. In some embodiments where strands 12 and 14 are made of the same material, the material from which strands 12 and 14 are made is a degradable composition in accordance with the present disclosure. When a material other than the present degradable composition is used to manufacture one of the sets of strands 12 or 14, such material may include a non-degradable composition.

Thus, the present degradable extruded netting may be manufactured entirely from degradable materials, or from a combination of degradable and non-degradable materials. In some embodiments, the degradable material used to prepare the present extruded netting may include a combination of materials including one or more polylactic acid (PLA) polymer composition, one or more polybutyrate adipate terephthalate (PBAT) polymer composition, a PLA-PBAT compatibilizer, and a degradation additive.

The PLA Composition

In general, the polylactic acid composition may include one or more polymers derived at least in part from lactide or lactic acid, such polymers being referred to, collectively, herein as polylactide or PLA.

In general, polymer nomenclature sometimes references polymers on the basis of the monomer from which the polymer is made, and in other instances characterizes the polymer based upon the smallest repeating unit found in the polymer. For example, the smallest repeating unit in polylactide is lactic acid (actually residues of lactic acid). However, in typical instances, commercial polylactide will be manufactured by polymerization of lactide monomer, rather than lactic acid. Lactide monomer, of course, is a dimer of lactic acid. Herein the terms "polylactic acid," "polylactide," and "PLA" are intended to include within their scope both polylactic acid-based polymers and polylactide based polymers, with the terms used interchangeably. That is, the terms "polylactic acid," "polylactide," and "PLA" are not intended to be limiting with respect to the manner in which the polymer is formed.

The term "polylactide based" polymer or "polylactic acid based" polymer is meant to refer to polymers of polylactic acid or polylactide, as well as copolymers of lactic acid or lactide, wherein the resulting polymer includes at least 50%, by weight, lactic acid residue repeating units or lactide residue repeating units. In this context, the term "lactic acid residue repeating unit" is meant to refer to the following unit:

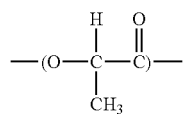

In view of the above definition, it should be clear that polylactide can be referred to both as a lactic acid residue containing polymer and as a lactide residue containing polymer. Herein the term "lactide residue repeating unit" is meant to refer to the following repeating unit:

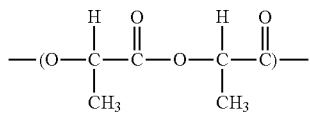

It should be appreciated that the lactide residue repeating unit can be obtained from L-lactide, D-lactide, and meso-lactide. The L-lactide is structured from two S-lactic acid residuals; the D-lactide is structured from two R-lactic acid residuals; and the meso-lactide is structured from both an S-lactic acid residual and an R-lactic acid residual.

In some embodiments, the PLA may be a linear aliphatic thermoplastic polyester derived from renewable resources such as, for example, corn, and is compostable in many settings. In recent years, PLA has been increasingly utilized in fiber applications such as netting, as it provides a raw material derived from a sustainable and renewable resource.

Plant based PLA derived from corn is well known. Traditionally, after steeping the corn in a mixture to loosen the molecular bonds, the mixture is ground up and centrifuged to separate the corn oil from the starch. Dextrose is then extracted from the starch using hydrolysis. Fermentation ultimately leads the dextrose to form lactic acid. After electrodialysis transforms the lactic acid into lactide, polymerization forms long lactide chains resulting in a fully plant-based PLA.

In some embodiments, the PLA composition includes a mixture of PLA polymers, at least some of which are derived from a sustainable and renewable resource, such as from the starch of plants.

In some embodiments, the PLA composition includes at least 50% by weight of PLA polymers that have a nominal average molecular weight of about 200,000 Daltons.

The PBAT Composition

In general, the PBAT composition can include one or more polymers including a diol-dicarboxylic acid condensation-type polyester which has an aliphatic dicarboxylic acid, an aromatic dicarboxylic acid and an aliphatic diol as its constitutive components. In some embodiments, the PBAT composition can include any biodegradable, statistical, aliphatic-aromatic copolyester. In some embodiments, the PBAT composition incudes at least one aliphatic-aromatic copolyester based on the monomers 1.4-butanediol, adipic acid, and terephthalic acid in the polymer chain. Such biodegradable polymers eventually degrade to carbon dioxide, water, and biomass when metabolized in the soil or compost under standard conditions. In some embodiments, the PBAT composition may be the commercially available F Blend C1200 sold under the trade name Ecoflex®, available from BASF SE.

In some embodiments, the PBAT composition includes at least 50% by weight of PBAT polymers. In cases where the PBAT includes polymers having a lower molecular weight than the polymers in the PLA composition, the PTAB composition, when mixed with the PLA composition, may increase the flexibility of PLA.

The PLA-PBAT Compatiblizer Composition

In general, the PLA-PBAT compatibilizer composition is any composition that helps ensure that a substantially homogenous mixture of PLA and PBAT is achieved. In some embodiments, the PLA-PBAT compatibilizer composition includes a mixture of a PLA carrier resin and a compatibilizer. In some embodiments, the PLA carrier resin constitutes from about 90% to about 99% by weight of the PLA-PBAT compatibilizer composition, with the balance being a compatibilizer. The PLA carrier resin may be any extrusion grade thermoplastic resin that processes easily. In some embodiments, the PLA carrier resin is transparent and derived from a renewable resource. In some embodiments, the PLA carrier resin may be Biopolymer 2003D sold under the trade name Ingeo™ available from NatureWorks, and may make up 95% of the PLA-PBAT compatibilizer composition. In some embodiments, the compatibilizer may be polypropyleneglycol di glycidyl ether (EJ400) or an epoxy based compound, such as epoxidized cottonseed oil (ECSO) or maleinized (MCSO) cottonseed oil. Other suitable compatibilizers that may be used in the PLA-PBAT compatibilizer composition include, but are not limited to, for example, isocyanate compounds including, but not limited to: 4,4'-diphenylmethane diisocyanate, dicyclohexylmethane diisocyanate, 3,3'-dimethyl 4,4'-diphenylmethane diisocyanate, hydrogenated 4,4'-diphenylmethane diisocyanate, 3,3'-tolidine 4,4'-diisocyanate, toluene diisocyanate, methylcyclohexane diisocyanate, hexamethylene diisocyanate, isophorone diisocyanate, a toluene diisocyanate, secondary methyl phenylene diisocyanate, hydrogenated secondary-toluylenebismaleimide diisocyanate, tetramethyl xylylene diisocyanate, tetramethylxylylene diisocyanate, methylene diphenyl diisocyanate, 4,4'-diisopropyl diphenyl diisocyanate, polymethylene polyphenyl diisocyanate, phenylene diisocyanate, 1,8-4-isocyanate methyl octane diisocyanate, 1,5-naphthalene diisocyanate, dianisidine diisocyanate, diphenyl ether diisocyanate, lysine methyl ester diisocyanate, lysine ester triisocyanate, triphenyl methane triisocyanate, triisocyanate phenyl phosphorothioate, 1,6,11-undecane triisocyanate, bicyclo heptane triisocyanate, trimethyl hexamethylene triisocyanate, polymethylene polyphenyl isocyanate, or a combination thereof. In some embodiments, the compatibilizer may also be Joncryl ADR sold by BASF, Lotader AX8900 sold by Arkema, or Biomax Strong 120 sold by DuPont.

The Degradation Additive

In some embodiments, the degradation additive includes a degrader in a carrier resin. In some embodiments, the carrier resin constitutes from about 90% to about 99% by weight of the degradation additive, with the balance being a degrader. In some embodiments, the carrier resin is biodegradable, transparent and derived from a renewable resource. In some embodiments, the carrier resin may be Biopolymer 2003D sold under the trade name Ingeo™ available from NatureWorks, and may make up 95% of the degradation additive. In some embodiments, the degrader includes iron stearate, however, any suitable degrader may be used. A suitable degradable additive may be an additive that causes the degradation of plastic materials based primarily on exposure to heat. While metal carboxylates are relatively well known degrader additives, examples of other degrader additives include, but are not limited to, unsaturated organic compound which are auto-oxidizable like ethers, acetals, ketals, amines, aldehydes, natural oils, unsaturated fatty acids and other compounds that help in the generation of free radicals and peroxides that are involved in the oxidation reactions.

Other Additives

In some embodiments, conventional additional additives may be included in the composition used to make the extruded netting.

In some embodiments, a suitable photo-degradable additive may be used. A suitable photo-degradable additive is an additive that causes the degradation of plastic materials based primarily on exposure to light. Examples of photo-degradable additives include, but are not limited to, photo sensitive polymers like aromatic ketones, aromatic amines, peroxides, quinones, and azo compounds.

In some embodiments, a colorant may be included. Colorants are capable of affecting the degradation rate since it can diminish the intensity of the UV rays, by reflect, diffuse, absorb, or defract the UV rays. One suitable colorant includes the green colorant 29025 GN PE Masterbatch, available from PolyOne Corporation of Assesse, Belgium, which is a green colorant in a carrier to impart green color to the resulting extruded netting.

In some embodiments, a stabilizer is included. A stabilizer can help to protect the netting from excessive degradation from exposure to UV light. In at least certain embodiments, the stabilizer can include a hindered amine compound, such as an oligomeric hindered amine light stabilizer or hindered amine light stabilizer (HALS).

Illustrative Compositions

In some embodiments, the polymeric composition blend used to manufacture degradable extruded netting may include the PLA composition in an amount ranging from about 55% to about 60%, the PBAT composition in an amount ranging from about 35% to about 40%, the compatibilizer composition in an amount ranging from about 0.5% to about 3%, and a degradation additive in an amount ranging from about 2% to about 7%.

Preparing the Extrudable Composition

The extrudable composition can be prepared by any conventional process for forming polymeric compositions. These processes include, but are not necessarily limited to, compounding. Generally, suitable methods for making the polymeric blend composition include compounding, either as a separate operation using a twin-screw extruder, or in-line compounding using a single-screw extruder equipped with a screw that features good distributive and dispersive mixing characteristics.

Non-Degradable Fiber Compositions

As noted above, in some embodiments some of the strands 12, 14 may be made from non-degradable fiber compositions. In some embodiments, the non-degradable fiber compositions may include non-elastomeric materials such as nylons, polyesters, polylactic acids, polypropylene, polyethylenes including HDPE and copolymers of such resins. In some embodiments, the non-degradable fibers are made from polyolefins. In some embodiments, the non-degradable fibers are made from polypropylene.

Net Preparation

The present degradable extruded netting may be prepared by any suitable extrusion process. Generally, suitable methods for making the extruded netting includes extruding a polymeric blend composition as described above, through dies with reciprocating or rotating parts to form the netting configuration. This creates cross machine direction strands that cross the machine direction strands, which flow continuously. Of course, it should be understood that the present degradable polymeric blend compositions could be used to form both the cross machine direction strands and the machine direction strands, or one or part of the strands, in which case, another material such as a different biodegradable material or a non-degradable material could be used to form the other strands. After the extrusion, the netting is then typically stretched in the machine direction using a differential between two sets of nip rollers. After this, the material is then typically stretched in any suitable manner, such as that described in U.S. Pat. No. 4,152,479, which is incorporated herein by reference, in the cross direction using a tenter frame. It should be understood, however, that the above described method is just one of many suitable methods that can be employed to manufacture extruded netting in accordance with the present invention.

EXAMPLES

The subject matter of the present disclosure is further illustrated by the following non-limiting Examples:

Example 1

A degradable extruded film in accordance with this disclosure is manufactured using a mixture including 57% Biopolymer 2003D sold under the trade name Ingeo™ available from NatureWorks as the PLA composition, 38% F Blend C1200 sold under the trade name Ecoflex®, available from BASF SE as the PBAT composition, 2% TECHMER PLAM111474 compatibilizer, and 3% degradation additive, the additive including 5% iron stearate and 95% PLA carrier resin. The film is produced by well-known extrusion methods, where the composition is extruded through a desired die at a temperature of about 355 to about 380 degrees Fahrenheit. After extrusion, the film is run into nip rollers, and finally to a roll stack.

Example 2

A degradable extruded film in accordance with this disclosure is manufactured using a mixture including 55% Biopolymer 2003D as the PLA composition, 38% F Blend C1200 as the PBAT composition, 2% TECHMER PLAM111474 compatibilizer, and 5% degradation additive, the additive including 5% iron stearate and 95% PLA carrier resin. The film of the composition of Example 2 was extruded using the same method as Example 1.

Example 3

A degradable extruded film in accordance with this disclosure is manufactured using a mixture including 60% Biopolymer 2003D as the PLA composition, 38% F Blend C1200 as the PBAT composition, 2% TECHMER PLAM111474 compatibilizer, and no degrader additive. The film of Example 3 was extruded using the same method as Example 1.

Example 4

A degradable extruded film in accordance with this disclosure is manufactured using a mixture including 55% Biopolymer 2003D as the PLA composition, 38% F Blend C1200 as the PBAT composition, 2% TECHMER PLAM111474 compatibilizer, 2.5% degradation additive having iron stearate, and 2.5% degradation additive having manganese stearate. The additive including 2.5% iron stearate, 2.5% manganese stearate, 95% PLA carrier resin. The film of the composition of Example 4 was extruded using the same method as Example 1.

Example 5

A degradable extruded film in accordance with this disclosure is manufactured using a composition of polypropylene. No degrader additive was used. The film of the composition of Example 5 was extruded using the same method as Example 1.

Example 6

A degradable extruded netting in accordance with this disclosure is manufactured using a mixture including 57% Biopolymer 2003D sold under the trade name Ingeo™ available from NatureWorks as the PLA composition, 38% F Blend C1200 sold under the trade name Ecoflex®, available from BASF SE as the PBAT composition, 2% TECHMER PLAM111474 compatibilizer, and 3% degradation additive, the additive including 5% iron stearate and 95% PLA carrier resin. The netting was produced by extruding the composition through dies with reciprocating or rotating parts to form the netting configuration. The extruded netting was then stretched in the machine and cross directions at a temperature of 100 degrees Fahrenheit to 250 degrees Fahrenheit.

Example 7

A degradable extruded netting in accordance with this disclosure is manufactured using a mixture including 55% Biopolymer 2003D as the PLA composition, 38% F Blend C1200 as the PBAT composition, 2% TECHMER PLAM111474, and 5% degradation additive, the additive including 5% iron stearate and 95% PLA carrier resin. The netting was produced using the same procedure as in Example 6.

Figure 2:
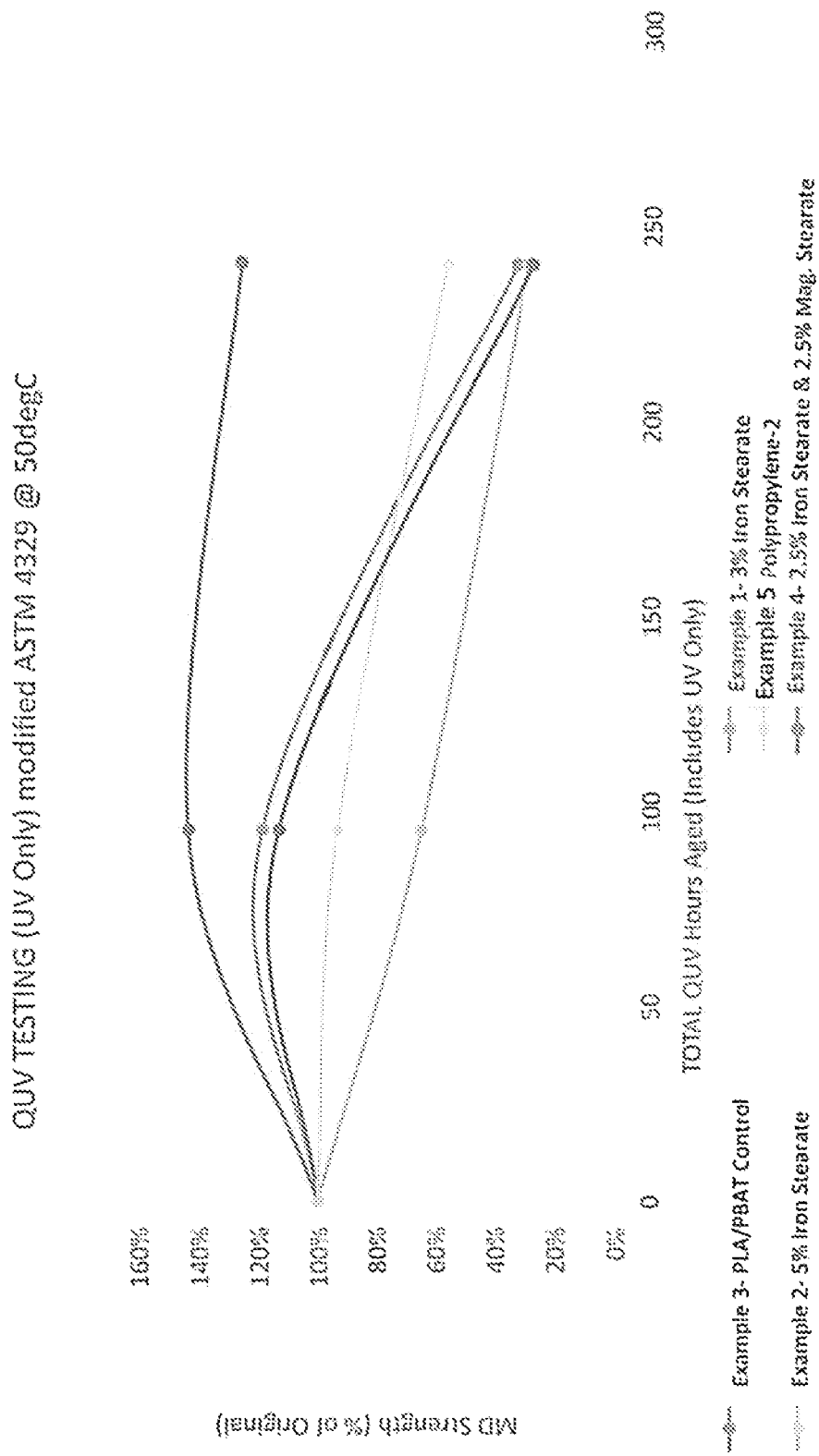
FIG. 2 depicts QUV Testing Data gathered from extruded films made from compositions in accordance with Examples 1 and 2 of the present disclosure as well as comparative compositions showing percentage of strength loss in the machine direction over time.

Testing of the strength loss in the machine direction (MD strength loss) were performed on the films of EXAMPLES 1 and 2, a PLA/PBAT control film (Example 3), and extruded films made from the selected compositions in Table 1 below. The MD strength loss of each sample was collected through QUV-Accelerated Weathering testing that follows a slightly modified version of the procedures outlined in ASTM D4329-13. Q-Panel, QUV-Basic, and QUV-EM, were used to expose samples to conditions of 50 degrees Celsius with and without condensation. UVA-340 lamps were used over the course of 240 hours in an attempt to recreate conditions similar to that of a typical outdoor environment for an extended period of time. The data collected from these strength loss tests is shown in FIGS. 2 and 3.

Testing of the strength loss in the machine direction (MD strength loss) of the degradable extruded nettings in accordance with the present disclosure was performed on nettings made from the compositions of EXAMPLES 6 and 7 as well as nettings made from selected compositions in Table 1 below. The data collected from these strength loss tests is shown in FIG. 4.

Heat stability testing was conducted on films made from the compositions of EXAMPLES 1, 2, and 4, a PLA/PBAT control (Example 3). No heat stabilizers were included with the given formulations. To test the material, film samples were run on a cast film line at 365 degrees Fahrenheit to determine which compositions may show signs of thermal degradation within the extrusion device during processing due to the compositions heat profile. Degradation during processing results in a lower pounds of force per inch measurement for a given example, as the polymer breaks down via hydrolysis, depolymerization, oxidation, etc. The data gathered from the heat stability testing is shown in Table 1, below. The PLA/PBAT Control (Example 3) had a force per square inch value that was 5061 lb/square inch. Examples 1 and 2 had a higher value, while Example 4 showed signs of degradation and therefore had lower values.

TABLE 1

| EXAMPLE | Composition in % | Average Lb. Force | Average Thickness (in) | Lb. Force/ Square Inch | QUV Accelerated Weatheirng Rank Performance (Faster = lower #) |
|---|---|---|---|---|---|
| 1 | 57 PLA/38 PBAT/2 Compatibilizer/3 Degrader Additive having Iron Stearate | 12.0 | 0.0084 | 5714.29 | 5.5 |
| 2 | 55 PLA/38 PBAT/2 Compatibilizer/5 Degrader Additive having Iron Stearate | 12.2 | 0.0090 | 5422.22 | 4 |
| 3 | 60 PLA/38 PBAT/2 Compatabilizer (no degrader) | 12.4 | 0.0098 | 5061.22 | 9 |
| 4 | 55 PLA/38 PBAT/2 Compatibilizer/2.5 Degrader Additive having Iron Stearate & 2.5 Manganese Stearate | 12.8 | 0.0105 | 4883.81 | 4 |

The present degradable netting can also be used to form other types of composites wherein the netting is secured to at least one or more layers of material. Examples of such composites include consumer wipes, reinforced tissue towels, and erosion control composites. Depending on the desired function of the netting, one of ordinary skill could determine which compositions should be used in making each layer, thereby controlling the rate of degradation.

While embodiments of this disclosure have been described, it is not intended that the disclosure be limited thereto, as it is intended that the disclosure be as broad in scope as the art will allow and that the specification be read likewise. Therefore, the above description should not be construed as limiting, but merely as exemplifications of presently disclosed embodiments. Thus, the scope of the embodiments should be determined by the appended claims and their legal equivalents, rather than by the examples given.

Persons skilled in the art will understand that the products and methods specifically described herein are non-limiting exemplary embodiments. The features illustrated or described in connection with one exemplary embodiment may be combined with the features of other embodiments. Various alternatives and modifications can be devised by those skilled in the art without departing from the disclosure. Accordingly, the present disclosure is intended to embrace all such alternatives, modifications and variances. As well, one skilled in the art will appreciate further features and advantages of the present disclosure based on the above-described embodiments. Accordingly, the present disclosure is not to be limited by what has been particularly shown and described, except as indicated by the appended claims.

The invention claimed is:

1. A degradable extruded netting comprising:
a plurality of interconnected strands, at least some of the strands being made from a polymeric blend, the polymeric blend including:
  a polylactic acid composition in an amount ranging from about 55 wt % to about 60 wt %, wherein the polylactic acid composition comprises one or more polylactic acid polymers derived from plant starch;
  a polybutylene adipate terephthalate (PBAT) composition in an amount ranging from about 35 wt % to about 40 wt %;
  a compatibilizer composition in an amount ranging from about 0.5 wt % to about 3 wt %; and
  a degradation additive in an amount ranging from about 2 wt % to about 7 wt %.

2. The degradable extruded netting of claim 1, wherein the polymeric blend includes:
  about 38 wt % polybutylene adipate terephthalate composition; and
  about 2 wt % polylactic acid-polybutyrate compatibilizer.

3. The degradable extruded netting of claim 1, wherein the degradation additive comprises a metal carboxylate in a carrier resin.

4. The degradable extruded netting of claim 1, wherein the degradation additive comprises iron stearate in a carrier resin.

5. The degradable extruded netting of claim 1, wherein the polybutylene adipate terephthalate (PBAT) composition comprises one or more polybutylene adipate terephthalate (PBAT) polymers.

6. The degradable extruded netting of claim 1, wherein the compatibilizer composition comprises a compatibilizer selected from the group consisting of polypropyleneglycol diglycidyl ether, epoxidized cottonseed oil (ECSO), or maleinized (MCSO) cottonseed oil.

7. A composite comprising:
  the degradable extruded netting of claim 1, the netting having a first side and a second side opposite the first side; and
  a first layer of material secured to the first side of the netting.

8. The degradable extruded netting of claim 1, wherein the netting is configured for use as an erosion control netting.

9. A polymeric blend composition suitable for preparing a degradable extruded netting, the polymeric blend composition comprising:
  a polylactic acid composition in an amount ranging from about 55 wt % to about 60 wt %;
  a polybutyrate composition in an amount ranging from about 35 wt % to about 40 wt %;
  a compatibilizer composition in an amount ranging from about 0.5 wt % to about 3 wt %,
    wherein the compatibilizer composition comprises a compatibilizer selected from polypropyleneglycol diglycidyl ether, epoxidized cottonseed oil (ECSO), or maleinized (MCSO) cottonseed oil; and
  a degradation additive in an amount ranging from about 2 wt % to about 7 wt %.

10. The polymeric blend composition of claim 9, comprising:
  about 38 wt % polybutyrate composition; and
  about 2 wt % polylactic acid-polybutyrate compatibilizer.

11. The polymeric blend composition of claim 9, wherein the degradation additive comprises a metal carboxylate in a carrier resin.

12. The polymeric blend composition of claim 9, wherein the degradation additive comprises iron stearate in a carrier resin.

13. The polymeric blend composition of claim 9, wherein the polybutyrate composition comprises one or more polybutylene adipate terephthalate (PBAT) polymers.

14. The polymeric blend composition of claim 9, wherein the polylactic acid composition comprises one or more polylactic acid polymers derived from plant starch.

15. A degradable extruded netting comprising:
a plurality of interconnected strands, at least some of the strands being made from a polymeric blend, the polymeric blend including:
a polylactic acid composition in an amount ranging from about 55 wt % to about 60 wt %;
a polybutylene adipate terephthalate (PBAT) composition in an amount ranging from about 35 wt % to about 40 wt %;
a compatibilizer composition in an amount ranging from about 0.5 wt % to about 3 wt %, wherein the compatibilizer composition comprises a compatibilizer selected from the group consisting of polypropyleneglycol diglycidyl ether, epoxidized cottonseed oil (ECSO), or maleinized cottonseed oil (MCSO); and
a degradation additive in an amount ranging from about 2 wt % to about 7 wt %.

16. The degradable extruded netting of claim 15, wherein the polymeric blend includes:
about 38 wt % polybutylene adipate terephthalate composition; and
about 2 wt % polylactic acid-polybutyrate compatibilizer.

17. The degradable extruded netting of claim 15, wherein the degradation additive comprises a metal carboxylate in a carrier resin.

18. The degradable extruded netting of claim 15, wherein the degradation additive comprises iron stearate in a carrier resin.

19. A composite comprising:
the degradable extruded netting of claim 15, the netting having a first side and a second side opposite the first side; and
a first layer of material secured to the first side of the netting.

* * * * *